Nov. 10, 1959  G. FRESIA  2,912,250
DEVICE SHAPED AS A PARALLELOGRAM FOR THE DIRECTION
OF THE THIRD AXLE IN MOTOR VEHICLES AND TRAILERS
Filed Dec. 13, 1956

United States Patent Office 2,912,250
Patented Nov. 10, 1959

2,912,250

DEVICE SHAPED AS A PARALLELOGRAM FOR THE DIRECTION OF THE THIRD AXLE IN MOTOR VEHICLES AND TRAILERS

Giulio Fresia, Millesimo, Savona, Italy

Application December 13, 1956, Serial No. 628,019

2 Claims. (Cl. 280—81)

The present invention relates to multi-wheel vehicles, and in particular to those vehicles of the type having a pair of tandem axles at the rear.

It is well known that in an arrangement of closely spaced tandem axles the wheels supporting these axles should "track" properly with respect to the front dirigible wheels, so as to avoid drag and scuffing of the tires, as well as excessive wear and tear on the elements of the suspension.

It is one object of the present invention, to provide a tandem axle arrangement wherein each of the axles is mounted independently relative to the other for rotation upon a substantially horizontal axis, as well as for movement in a substantially vertical plane.

It is another object of the present invention to provide a tandem axle arrangement which comprises a pair of axles which is mounted on a frame for rotation upon an axis substantially perpendicular to the longitudinal axis of these axles, and which includes a sheath slidably mounted on one of the axles, as well as a pair of bars connected at one end with a universal joint and at the other end to the sheath, so that the axles are interconnected by means of the universal joint.

It is yet another object of the present invention to provide a device as set forth above, which includes stirrups which are slidably disposed on the sheath carrying axle and connected thereto.

With these and other objects in view, which will become apparent in the following detailed description, the present invention will be clearly understood in connection with the accompanying drawings, in which.

Figures 1, 2:
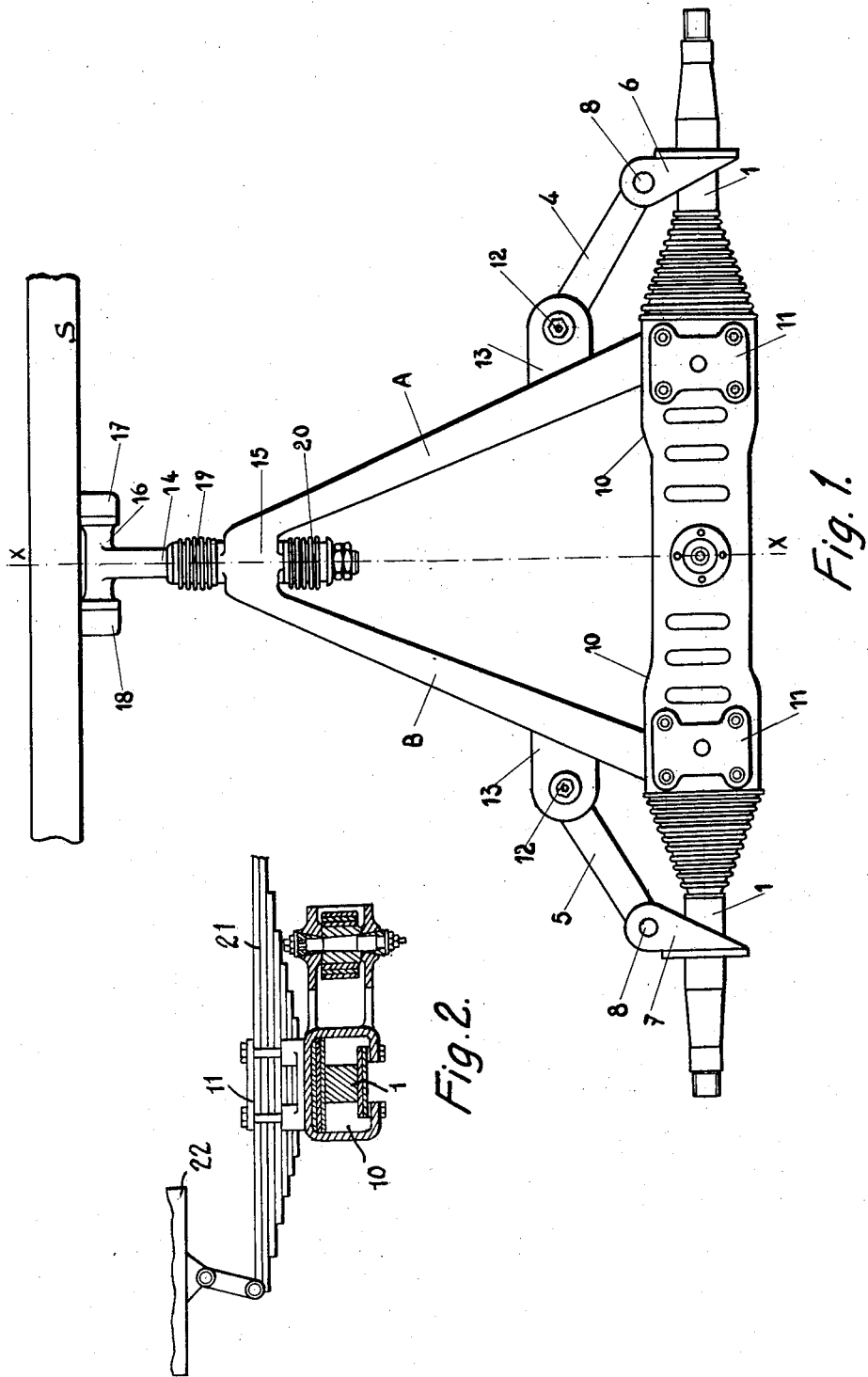
Figure 1 is a plan view of a joint for a tandem axle.
Fig. 2 shows in section the sheath arrangement for the rear axle.

Referring now to the drawings, the tandem axle arrangement comprises a front axle S and a rear axle 1, the latter being provided with stirrups 6 and 7, respectively, permanently secured to said axle. A sheath 10 is movable axially along said axle and mounted thereon and equipped with chassis leaf springs 21 (Fig. 2) in conventional manner secured to the frame 22 by means of special supports 11. Stay rods 4 and 5 are pivotally connected to the supports 6 and 7, respectively, at one end of said stay rods 4 and 5, while the other end of the latter is secured pivotally to supports 13, which supports project from connecting bars A and B, respectively, which are adapted to provide a connection between the axles 1 and S. The stay rods 4 and 5 are connected with the support 13 by means of the pivots 12.

One end of the bars A and B is connected to the sheath 10 of the axle 1 and the bars A and B form together with said sheath a triangular structure. At the joining point 15 of the bars A and B, the latter are rotatably mounted upon a shaft 14 between springs 19 and 20 disposed upon the shaft 14, which springs 19 and 20 are adapted to return the bars A and B to the normal position relative to the shaft 14. The shaft 14 forms at one end a pin 16 disposed perpendicularly to the axis of the shaft 14, which pin 16 is mounted in bearings 17 and 18, permitting turning upon a horizontal axis disposed parallel to the axis of the axle S. The bearings 17 and 18 are permanently and rigidly secured to the axle S.

Since the axles S and 1 may perform a turning movement upon the axis x—x on the one hand, and upon the axis of the pin 16, rotatably mounted in the bearings 17 and 18, on the other hand, the structure amounts to a universal joint between the axles S and 1, which is particularly advantageous for a proper operation of the tandem axle arrangement.

Referring now to Fig. 2, the rear axle 1 is shown with the sheath 10 in section and Fig. 2 indicates quite clearly that the axle 1 is movable axially within the sheath and carries the special supports 11 for the leaf springs 21. The sheath arrangement is shown, however, by example only, and can be varied without changing its function relative to the rear axle.

While I have disclosed one embodiment of the present invention, it is to be understood that this embodiment is given by example only and not in a limiting sense, the scope of the present invention being determined by the objects and the claims.

I claim:

1. In a device of the character disclosed in combination, a pair of axles disposed substantially horizontally and apart from each other, means including a sheath slidably mounted on one of said axles, means including a pair of bars connected at one end with said sheath, and a shaft extending through and rotatably movable in the other end of said bars, a pin secured to the front end of said shaft and disposed substantially parallel to the other of said axles, said other of said axles carrying bearings receiving the ends of said pin and permitting rotation of said shaft upon the axis of said pin, thereby interconnecting said axles for relative rotation upon an axis disposed parallel to said axles as well as upon an axis crosswise thereto and for relative movement in the direction of said last mentioned axis, said shaft and pin jointly with said bars forming a universal joint.

2. The device, as set forth in claim 1, which includes stirrups slidably disposed on and connected with said one of said axles.

References Cited in the file of this patent

UNITED STATES PATENTS

| | | |
|---|---|---|
| 2,227,448 | Freeman | Jan. 7, 1941 |
| 2,401,687 | Letzkus | June 4, 1946 |